United States Patent [19]

Shirai

[11] 3,889,276
[45] June 10, 1975

[54] ELECTRONIC SHUTTER CONTROL DEVICE FOR CAMERAS

[75] Inventor: Osamu Shirai, Nakano, Japan

[73] Assignee: Kabushiki Kaisha Cosina, Nakano-shi, Japan

[22] Filed: Jan. 2, 1974

[21] Appl. No.: 429,585

[30] Foreign Application Priority Data

Dec. 29, 1972 Japan.................................. 48-2514

[52] U.S. Cl. ........................ 354/31; 354/38; 354/51
[51] Int. Cl. .............................................. G03b 7/00
[58] Field of Search .............. 354/24, 31, 38, 50, 51

[56] References Cited
UNITED STATES PATENTS

| | | | |
|---|---|---|---|
| 3,498,193 | 3/1970 | Shimomura et al.................... | 354/31 |
| 3,682,057 | 8/1972 | Sato...................................... | 354/31 |
| 3,690,241 | 9/1972 | Nomura................................. | 354/31 |
| 3,691,917 | 9/1972 | Uchida et al. ....................... | 354/50 X |
| 3,698,302 | 10/1972 | Sato...................................... | 354/31 |
| 3,731,604 | 5/1973 | Fujii et al.............................. | 354/31 |

Primary Examiner—Richard A. Wintercorn
Attorney, Agent, or Firm—Young & Thompson

[57] ABSTRACT

Electronic shutter control device comprising a light measuring means for measuring light through the objective lens, a memorizing means and a shutter control circuit for controlling exposure time of a shutter movable between its opening position and closing position. The light measuring means measures light from an object to be photographed and passing through the objective lens before and after shutter opening. When a first light-receiving element is in the center of the image plane, it gives relatively great weight to the measurement of the light from the center of the field. Thereafter, the first light-receiving element moves to the side of the image plane and the second light-receiving element together with the first light-receiving element in the moved position give relatively great weight to the measurement of the light from the periphery of the field. Either average light measuring or center light measuring can be selectively effected. The object brightness before shutter opening memorized in the memorizing means in addition to the object brightness after the opening of the shutter is delivered to the shutter control circuit, and thus the exposure time is controlled.

6 Claims, 5 Drawing Figures

ELECTRONIC SHUTTER CONTROL DEVICE FOR CAMERAS

BACKGROUND OF THE INVENTION

This invention relates to electronic shutter control device for cameras. More particularly, in a camera having a so-called TTL light measurement system for measuring light entering through the objective lens, information to the object before the shutter opens is kept memorized in a memorizing means and information according to the brightness of the object after the shutter opens are supplied in overlapped relation to the shutter control circuit so that the brightness of the object at the time of photographing is accurately received for effecting appropriate exposure.

The electronic shutter control device that is referred to as an external light measuring system is such that the object brightness from the object does not pass through the objective lens, but rather the scene is directly received in a light-receiving element by which exposure time is set. With this arrangement, even at the time of shutter opening, light enters the light-receiving element, so there is no need to memorize the object brightness. However such external light measuring systems cannot measure exactly light which is radiated from the object and which will be incident upon the film.

Contrasted to this, the known TTL light measuring system is superior in that it can measure the actual light incident upon the film. However, the light-receiving element should be retracted from the photographing light path or it is interrupted by a reflex mirror so that memorizing means such as a capacitor for memorizing the object brightness before shutter opening should be provided to control exposure time depending on its memorized value. This TTL light measuring system controls the exposure time according to object brightness before shutter opening. Therefore, in the case of self-photographing or if a long exposure time is required as the objective brightness is low, correct exposure cannot be expected as it often happens that the object brightness varies after the shutter opens.

SUMMARY OF THE INVENTION

Therefore the primary object of the present invention is to furnish an electronic shutter control device in which information detected before shutter opening and memorized is compensated with information detected after shutter opening so that even in case the object brightness varies after shutter opening, appropriate exposure time can be determined.

Another object of the present invention is to furnish an electronic shutter control device in which light measuring means gives relatively great weight to the brightness of the center of the field, that is, measures light in the center of the image plane before shutter opening, and then does the same for peripheral portions of the field, that is, measures a peripheral portion of the image plane after shutter opening. Further by giving weight to both light measuring values and supplying them to the shutter control circuit, one is thus enabled selectively to practice either average light measuring or center-weighted light measuring.

According to a preferred embodiment of the present invention, these objects can be achieved by providing an electronic shutter control device, having a shutter movable between its opening and closing positions and a shutter control circuit for controlling the opening time, which controls the exposure time depending on light passing through objective lens. Said device further provides a light measuring means for detecting the object brightness before and after shutter opening, a memorizing means to memorize the object brightness before shutter opening obtained by said light measuring means and supply means for compensating the object brightness before shutter opening with the object brightness after shutter opening to supply the memorized value of the said memorizing means in addition to the object brightness after shutter opening to the shutter control circuit.

According to another embodiment, the light measuring means includes first and second light-receiving elements. The first light-receiving element is disposed behind a semi-transparent portion of the center of a reflex mirror and measures object brightness before shutter opening; and then preparatory to the shutter opening, the said element is moved to one side of the mirror housing, where photographing is not interrupted, and at which latter position the said element measures the object brightness after shutter opening. The second light-receiving element is positioned in the mirror housing symmetrically to the position of the first light-receiving element relative to the optical axis and measures the object brightness after shutter opening.

According to a still further embodiment, the device of the present invention comprises a proportional weighting means consisting of at least two resistances connected in series and leading to the output terminal of the amplifier for giving weight to information according to the brightness of the object before the shutter opens and information according to the brightness of the object after the shutter opens.

Other objects and advantages of the present invention will become apparent as the detailed description of the preferred embodiments proceeds, with reference to the accompanying drawings.

DETAILED DESCRIPTION OF THE INVENTION

Figure 1:
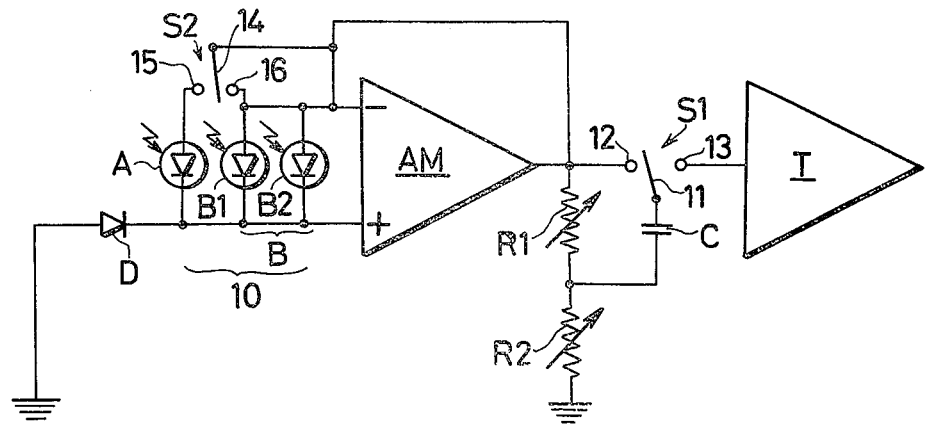
FIG. 1 is a diagram of the shutter control circuit of the present invention.

Referring to FIG. 1, reference A designates a first light-receiving element for measuring light passing through the objective lens and to be incident upon the image plane preparatory to the opening of the shutter. For example in the case of a single lens reflex camera, this is located in the finder light path from the reflex mirror to the eyepiece; or, in the photographing light path from the objective lens to the film plane. However in case of the latter a first light receiving element is movable prior to the shutter opening, to a position where photographing is not interrupted. B is a second light-receiving element for measuring light passing through the objective lens and to be incident upon the peripheral portion of image plane after the shutter opens, and thus the brightness of the object to be photographed is measured when the shutter is opened. Therefore the second light-receiving element B is located where exposure of image plane will not be interrupted.

For assuring more exactness, element B is in the form of two spaced light-receiving elements B1, B2. For these first and second light-receiving elements, it is preferable to use quick-response silicon photocells. Thus a light-measuring means 10 is comprised by these first and second light-receiving elements.

D represents a logarithm-conversion diode for obtaining output signals of minimal fluctuation from input signals detected in the light measuring means by applying logarithm compression. AM is an operational amplifier having a very large value of input impedance. In this, the input signal obtained in said first or second light-receiving element is amplified and delivered to the subsequent circuit element.

Resistances R1, R2 are means for giving proportional weight to information detected by said first and second light-receiving elements A and B. Preferably, their resistance value is variable. At the junction of resistances R1 and R2, one terminal of capacitor C is connected. The other terminal of capacitor C is connected to a movable contact 11 of a first switch S1. Said capacitor C is a memorizing means for converting information detected in the first light-receiving element A to a store of electric charge. Alternatively the memorizing means can effect memorizing by converting information to magnetic values or resistance values.

T is a shutter control circuit to control exposure time by the output signal obtained on the basis of information detected by the first and second light-receiving elements A and B. This shutter control circuit may be entirely conventional and may include, for example, a CR integrating circuit, a switching element such as a transistor that effects switching with the terminal voltage of a capacitor in the CR integrating circuit, and magnet means connected to said switching element, for example in the focal plane shutter to prevent the movement of the rear screen of the closing shutter. There are a number of patents disclosing such shutter control circuits and therefore a more detailed description thereof can be omitted.

First switch S1 comprises a movable contact 11, a contact 12 connected to the output terminal of operational amplifier AM and contact 13 connected to the input terminal of the shutter control circuit T. In switch S1, the movable contact 11 is switched from the contact 12 to the contact 13 when the shutter opens, at the latest. Thereby the information obtained from the first light-receiving element A is memorized in the memorizing means C and is delivered, in addition to the information obtained from the second light-receiving element B, to the shutter control circuit T.

Switch S2 is a second switch whereby the input terminal of the operational amplifier is selectively connected to the first light-receiving element A or to the second light-receiving element B, and includes a movable contact 14 connected to the input terminal of the operational amplifier AM, a contact 15 connected to the first light-receiving element A and contact 16 connected to the second light-receiving element B. Normally the movable contact 14 is connected to the contact 15 and switched to the contact point 16 at the latest when the shutter opens. These switches S1 and S2 are actuated in association with the working of the shutter release.

The electronic shutter control device of FIG. 1 operates as follows:

Prior to the opening of the shutter, the movable contact 14 of the second switch S2 is allowed to contact the contact 15 which is connected to the first light-receiving element A and also the movable contact 11 of the first switch S1 contacts the contact 12; thus the memorizing means or capacitor C is connected in parallel to resistance R1. Light from an object passing through the objective lens strikes the first light-receiving element A to generate short-circuited current ISA. This short-circuited current ISA flows to diode D to produce output signals VA of operational amplifier AM. Under this condition, capacitor C is charged to a potential equal to the output VA of the operational amplifier AM divided by resistance R1 and R2 so that $VCA = R1/R1 + R2 \ VA$; and thus the object brightness before shutter opening, as measured by the first light-receiving element A, is memorized.

Next, in association with the shutter release operation, the movable contact 11 of the first switch S1 is switched to the contact 13 which is connected to the shutter control circuit T and likewise, the second switch S2 is switched to the contact 16 which is connected to the second light-receiving element B. In this instance, if the first light-receiving element A is in the central portion of the image plane, this element is moved to a position where the object is not photographically interrupted. Simultaneously upon the switching of the first and second switches, S1, S2, the shutter is opened. Then the short-circuited current ISB in the second light-receiving element B flows to diode D to produce output signal VB at the output terminal of the operational amplifier AM. With this output signal VB, at the junction of R1, R2 and capacitor C, a potential of $VCB = R2/R1 + R2 \ VB$ is impressed on the capacitor C. This is, at the time of opening of the shutter, an output signal of $R1/R1 + R2 \ VA + R2/R1 + R2 \ VB$ is supplied to the shutter control circuit T. With this output signal, the CR integrating circuit is actuated and when the condenser in CR integrating circuit is charged to a certain potential, current flowing to the magnet that is attractively holding the closing shutter blade is blocked whereby the exposure is terminated.

The above is the case when the first light-receiving element A is in the central portion of the image plane or in the finder light path from the reflex mirror to the eyepiece and the second light-receiving element is in the peripheral portion of image plane. Other than this, it is possible to combine the first light-receiving element A and the second light-receiving element B at the place in the photographic light path where photographing is not interrupted, for example at the periphery of the image plane. In such a case of the light-receiving element, the light incident upon film is somewhat diminished in brightness but the light receiving-element is not photographed on the film.

A preferred embodiment in which the present invention is applied to a single lens reflex camera is shown in FIGS. 2–5.

Figure 2:
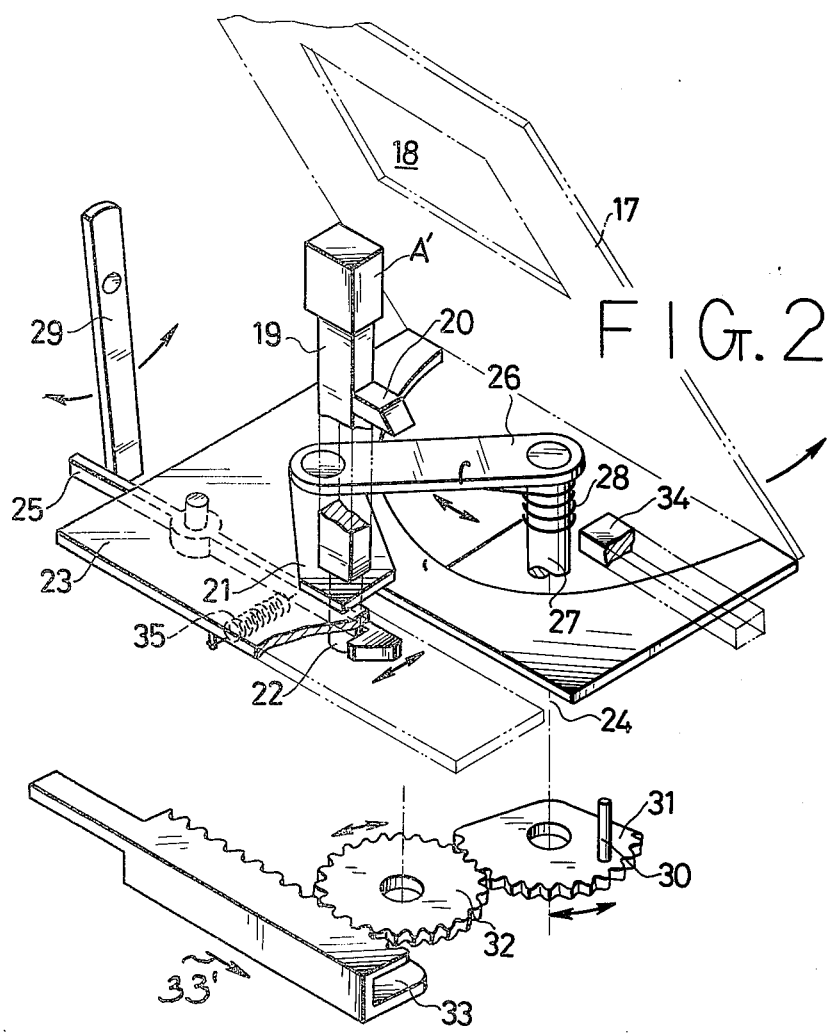
FIG. 2 is a fragmentary perspective view showing the moving means of the light-receiving elements.

In FIG. 2, there is shown means for moving the light-receiving elements. A reflex mirror 17 is disposed at an angle of 45° behind the objective lens (not shown) in the mirror housing (not shown), which mirror can spring up and has in its center a semi-transparent portion 18. Behind this semi-transparent portion 18, a first light-receiving element A' for receiving light passing therethrough is fixed on a supporting member 19. This supporting member 19 is provided with a projection 20 for depressing a shutter release member 34 which governs opening of the shutter. Also the supporting member 19 has a slide lever 21 carried thereby and from which an extension 22 protrudes. This extension 22 engages in a guide groove 24 of a base plate 23 and also engages with a hooked lever 25. One end of the slide lever 21 is connected to a crank lever 26. Opposite therefrom, the other end of the crank lever 26 is pivoted on a stud 27 and urged by a spring 28 in a counterclockwise direction as seen in FIG. 2. 29 is an intermediate lever turnable by means of time lag mechanism (not shown) in a clockwise direction after a certain time has passed from the springing up of the reflex mirror. A sector gear 31 engaging with an idler gear 32 is provided with a pin 30 which pushes the side edge of said crank lever 26 so that the first light-receiving element A' is brought to a position behind the half transparent portion 18 of the reflex mirror 17 in FIG. 2. Said sliding gear 32 engages rack gear 33 which slides in the direction of arrow 33' in association with the film winding operation. 35 is a spring urging hooked lever 25 clockwise.

Figure 3:
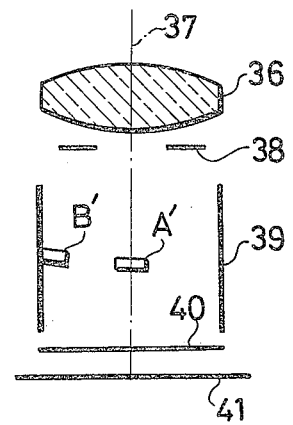
FIG. 3 shows the position of the light-receiving element before the shutter opens, in association with the moving means for the light-receiving element shown in FIG. 2, but omitting the reflex mirror for simplicity.

FIG. 3 shows a position of the light-receiving elements before shutter opening. 36 is an objective lens having an optical axis 37, while 38 is a diaphragm blade, and 39 is a mirror housing in which the reflex mirror 17 shown in FIG. 2 is obliquely mounted. For the simplicity of the drawings, FIGS. 3 and 4 are highly diagrammatic.

On the side wall of the mirror housing 39, the second light-receiving element B' is fixed at an angle toward the center of the aperture of the diaphragm. First light-receiving element A' is positioned behind the semi-transparent portion 18 of mirror 17 as shown in FIG. 2, which is the center portion of the image plane. 40 is a shutter blade having a front screen for opening the shutter and a rear screen for closing the shutter. 41 is the film.

Figure 4:
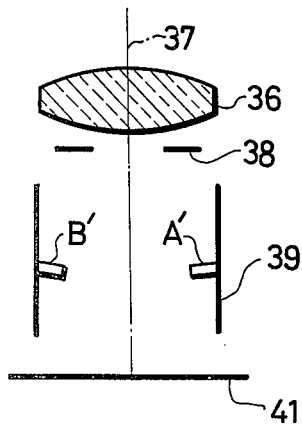
FIG. 4 is a view similar to FIG. 3 but showing the position of the light-receiving means after the shutter opens.

FIG. 4 shows the positions of the light-receiving elements after shutter opening. In FIG. 4 the first light-receiving element A' has moved from the center of the image plane to a position symmetrical to the second light-receiving element B' relative to the optical axis 37.

Figure 5:
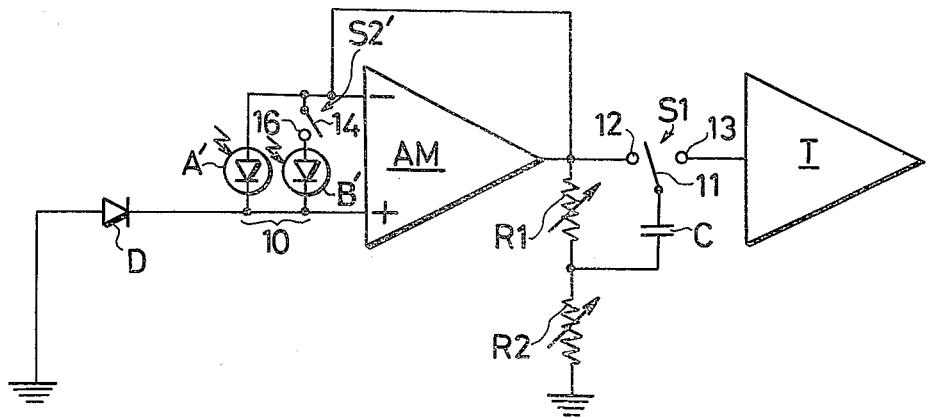
FIG. 5 is a circuit diagram of the electronic shutter control device of the present invention with light measuring means as shown in FIGS. 2–4.

FIG. 5 is a circuit diagram for the moving means of the light-receiving elements. As seen in FIG. 5 the first light-receiving element A' is capable of conjoint action with either of second light-receiving elements B1 and B2. For this, the first light-receiving element A' is directly connected to the operational amplifier AM and the second light-receiving element B' is connected through one terminal of a single throw type switch in parallel to the first light-receiving element A'. Thereby, more precise timing is assured, and the switch is simplified, which otherwise would be troublesome. In this diagram, the same numerals as in FIG. 1 are applied to the same parts.

The operation of the embodiments shown in FIGS. 2–5 is as follows:

Under the conditions shown in FIG. 2, when a release button (not shown) is depressed, firstly the diaphragm 38 is stepped down to a predetermined diaphragm value. Under this condition, light passing through the objective lens and the semi-transparent portions 18 of the reflex mirror 17 strikes the first light-receiving element A' and registers exposure information in a finder with its photometer (not shown). When the release button is depressed, the reflex mirror 17 springs up out of the photographing light path. After a very short time determined by a conventional time lag device (not shown), the intermediate lever 34 turns in a clockwise direction to push the hooked lever 25. Thereby the hooked lever 25 disengages from the projection 22. The crank lever 26 turns in a counterclockwise direction by the force of spring 28 and this moves the extension 22 along the groove 24 of base plate 23 and thus the slide lever 21 is moved.

With the sliding of the slide lever 21, the first light-receiving element A' is moved to one side of the mirror housing 39. As the first light-receiving element A' starts moving, though not illustrated, simultaneously with the slide lever 21 or the extension 22, the movable contact 11 of the first switch S1 is switched from the contact point 12 to the contact point 13 whereby as described with reference to FIG. 1, the object brightness before the opening of the shutter is memorized in the capacitor C. Just before the movement of first light-receiving element terminates, as in the case of the first switch S1, although not illustrated, the second switch S2 is closed and the shutter release lever 34 that governs the movement of the front screen of shutter 40 is depressed whereby the shutter 40 is opened.

After the shutter 40 is opened, the first light-receiving element A' and second light-receiving element B' are connected in parallel at the position in FIG. 4 and information as to the object brightness after the opening of the shutter is supplied to the operational amplifier AM. Then this information and said memorized information in said memorizing means are supplied in overlapped relation to the shutter control circuit T and as described before with reference to FIG. 1, the exposure time is controlled. When the shutter 40 is closed, by this signal the reflex mirror 17 and intermediate lever 29 are returned to the position shown in FIG. 2.

In association with the film winding operation, the rack gear 33 slides in the direction of arrow 33' and through the idler gear 32 turns the sector gear 31 in a clockwise direction. The sector gear 31 pushes the side edge of crank gear 26 to turn it in a clockwise direction. The slide lever 21 together with the crank lever 26 is moved along the guide groove 24 to the position shown in FIG. 1. At this time, the hooked lever 25 engages the projection 22 of the supporting member 19 and prevents its return movement. After the film is wound, the rack gear 23 slides in a direction reverse to that of arrow 33' and the sector gear 21 is turned in a counterclockwise direction as seen in FIG. 2.

In the embodiments shown in FIGS. 2–5, as the first light-receiving elements is positioned in the center of the image plane before the shutter opens, the light-measuring system effects light measuring only for the central portion of the object to be photographed. But after the shutter opens, the system effects light measuring for the peripheral regions of the object to be photographed with the first light-receiving element A' and the second element B'. Therefore by adjusting the value of variables R1 and R2 appropriately, of the output signal to be supplied to the shutter control circuit, that is, from the value VA R1/R1 + R2 + VB R2/R1 + R2 its weight factors R1/R1 + R2 and R2/R1 + R2 may be varied. For example by setting the resistance value of R1 and R2 to be the same, the weight given the object brightness before shutter opening and after shutter opening comes 50 percent respectively. Further, measuring the object brightness at three spots in the center and peripheral portion enables one to effect approximate average light measuring. Also by setting the resistance value or resistance R2 smaller than that of R1, for example the object brightness before shutter opening may be given a relative weight of 90 percent and that after shutter opening a weight of 10 percent, so that the central lighting of the object is given greater weight by preferring information measured at the center portion of the object.

The invention has been described in detail with particular reference to preferred embodiments thereof, but it will be understood that variations and modifications can be effected within the spirit and scope of the invention.

Having described my invention, I claim:

1. In an electronic shutter control device having a shutter movable between opened and closed positions, and a shutter controlling circuit that automatically controls exposure time depending on the brightness of an object to be photographed; the improvement comprising light measuring means for measuring the brightness of light from an object that enters through the objective lens, said light measuring means measuring the light incident to the central portion of the image plane before the shutter is opened and measuring the light incident to the peripheral portion of the image plane after the shutter is opened, means to weight the information obtained by said measuring means, memorizing means to memorize said weighted information, and means for supplying to said shutter controlling circuit the information memorized in said memorizing means before the shutter is opened, in overlapping relation with the information after the shutter is opened.

2. A device as claimed in claim 1, said light measuring means comprising first and second light receiving elements, said first light receiving element being disposed in the path of light from a reflective mirror to an eyepiece of a finder to measure the light entering the central portion of the image plane before the shutter is opened, said second light receiving element being fixed relative to said mirror to measure the light entering the peripheral portion of the image plane after the shutter is opened.

3. A device as claimed in claim 1, said light measuring means comprising first and second light receiving elements, said first light receiving element being disposed behind a reflective mirror to measure the light entering the central portion of the image plane before the shutter is opened, said first element being mounted for movement to one side of said mirror prior to the opening of the shutter to a position to measure the light entering the peripheral portion of the image plane after the shutter is opened, said second light receiving element being fixed relative to said mirror to measure light entering the peripheral portion of the image plane after the shutter is opened at a position symmetrical to the position to which that first element has moved relative to the optical axis of the mirror.

4. In an electronic shutter control device having a shutter movable between opened and closed positions, and a shutter controlling circuit that automatically controls exposure time depending on the brightness of an object to be photographed; the improvement comprising a first light receiving element disposed behind a reflective mirror to measure light entering the central portion of the image plane through the objective lens, said first element being movable to one side of said mirror to open the shutter and to measure light entering the peripheral portion of the image plane after the shutter is opened, a second light receiving element fixed at a position symmetrical to the position to which said first element has moved relative to the optical axis to measure light entering the peripheral portion of the image plane after the shutter is opened, an amplifier for amplifying the outputs of said first and second light receiving elements, weighting means comprising at least two resistances connected to an output terminal of said amplifier, a memorizing capacitor connected at the junction of said two resistances to memorize weighted information before the shutter opens, and means for applying a voltage between the terminals of said memorizing capacitor in addition to the potential at said junction of said resistances after the shutter is opened.

5. A device as claimed in claim 4, said weighting means comprising means to adjust the ratio of values of said two resistances thereby to adjust said weighting, whereby the light measuring of said central portion and the average light measuring of said central and peripheral portions may be selectively effected.

6. A device as claimed in claim 4, and a crank lever movable in association with a film winding operation from a first position to a second position, a spring member for urging said crank lever from said second position to said first position, a slide lever connected to said crank lever and supporting said first element, a guide groove for guiding an extension protruding from said slide lever, a hook lever for locking said crank lever in said second position, and an intermediate lever for actuating the lock lever in association with the movement of said mirror.

* * * * *